(12) United States Patent
Reimer

(10) Patent No.: US 9,746,548 B2
(45) Date of Patent: Aug. 29, 2017

(54) WIDE FIELD OF VIEW MULTIBEAM OPTICAL APPARATUS

(71) Applicant: Raytheon Canada Limited, Ottawa (CA)

(72) Inventor: Christopher Jacob Reimer, Collingwood (CA)

(73) Assignee: RAYTHEON CANADA LIMITED, Ottawa (CA)

( * ) Notice: Subject to any disclaimer, the term of this patent is extended or adjusted under 35 U.S.C. 154(b) by 199 days.

(21) Appl. No.: 14/442,253

(22) PCT Filed: Dec. 13, 2013

(86) PCT No.: PCT/CA2013/001041
§ 371 (c)(1),
(2) Date: May 12, 2015

(87) PCT Pub. No.: WO2014/094119
PCT Pub. Date: Jun. 26, 2014

(65) Prior Publication Data
US 2016/0274225 A1    Sep. 22, 2016

Related U.S. Application Data

(60) Provisional application No. 61/739,997, filed on Dec. 20, 2012.

(51) Int. Cl.
*G01C 3/08* (2006.01)
*G01S 7/481* (2006.01)
(Continued)

(52) U.S. Cl.
CPC ............ *G01S 7/4818* (2013.01); *G01S 7/481* (2013.01); *G01S 7/4812* (2013.01); *G01S 17/06* (2013.01);
(Continued)

(58) Field of Classification Search
CPC ...... G02B 19/0085; G02B 7/028; G02B 1/02; G01S 7/481; G01S 7/4818; G01S 7/4812;
(Continued)

(56) References Cited

U.S. PATENT DOCUMENTS 5,013,312 A * 5/1991 Parins ................ A61B 18/1402
606/37
7,505,121 B2 * 3/2009 Yamaguchi .............. G01C 3/08
356/28
(Continued)

FOREIGN PATENT DOCUMENTS

WO      9809185 A1    3/1998
WO      03044461 A1    5/2003
(Continued)

OTHER PUBLICATIONS

International Search Report and Written Opinion from PCT/CA2013/001041 mailed Apr. 1, 2014.
(Continued)

*Primary Examiner* — Mark Hellner
(74) *Attorney, Agent, or Firm* — Lando & Anastasi, LLP

(57) ABSTRACT

A multi-beam LIDAR optical system, that in one example includes a plurality of single mode optical fibers configured to transmit and receive light beams, and a plurality of lenses configured to collimate and focus the light beams between the plurality of single mode optical fibers and an entrance pupil of the system, wherein the system is configured to transmit and receive the light beams over an angular field of view of at least 5°.

20 Claims, 3 Drawing Sheets

(51) Int. Cl.
  *G02B 19/00* (2006.01)
  *G02B 7/02* (2006.01)
  *G01S 17/95* (2006.01)
  *G01S 17/58* (2006.01)
  *G01S 17/06* (2006.01)
  *G02B 1/02* (2006.01)

(52) U.S. Cl.
  CPC .............. *G01S 17/58* (2013.01); *G01S 17/95* (2013.01); *G02B 7/028* (2013.01); *G02B 19/0085* (2013.01); *G01S 7/4815* (2013.01); *G02B 1/02* (2013.01)

(58) Field of Classification Search
  CPC ........ G01S 7/4815; G01S 17/06; G01S 17/58; G01S 17/95
  USPC ....................................................... 356/5.01
  See application file for complete search history.

(56) References Cited

U.S. PATENT DOCUMENTS

| | | | |
|---|---|---|---|
| 7,978,312 B2* | 7/2011 | Scott | G01S 7/4818 356/3.01 |
| 8,190,030 B2* | 5/2012 | Leclair | G01S 7/4812 398/135 |
| 8,238,030 B2 | 8/2012 | Webb et al. | |
| 8,294,879 B2* | 10/2012 | Silny | G01S 7/4818 356/3.01 |
| 2004/0001677 A1 | 1/2004 | Kondis et al. | |
| 2006/0132752 A1 | 6/2006 | Kane | |
| 2012/0262698 A1 | 10/2012 | Day et al. | |
| 2015/0185246 A1* | 7/2015 | Dakin | G01P 5/26 356/28 |

FOREIGN PATENT DOCUMENTS

| | | |
|---|---|---|
| WO | 2007061543 A2 | 5/2007 |
| WO | 2012051700 A1 | 4/2012 |

OTHER PUBLICATIONS

Extended European Search Report for European Patent Application No. 13864501 dated Jul. 6, 2016.

Jenness, Jr., J. et al. "Design of a Lidar Receiver with Fiber-optic Output," Applied Optics, vol. 36, No. 18, pp. 4278-4284 (Jun. 20, 1997).

Nishi, H. et al. "Complementary 2 Dimensional Laser Doppler Velocimeter with an Optical Fiber Probe", SPIE vol. 1267, Fiber Optic Sensors IV, pp. 257-263 (1990).

* cited by examiner

WIDE FIELD OF VIEW MULTIBEAM OPTICAL APPARATUS

CROSS-REFERENCE TO RELATED APPLICATIONS

This application claims the benefit of U.S. Provisional Application No. 61/739,997 filed on Dec. 20, 2012 and titled "WIDE FIELD OF VIEW MULTIBEAM OPTICAL APPARATUS," which is herein incorporated by reference in its entirety.

BACKGROUND

There are several applications in which long range fiber-based laser systems, such as LIDAR systems, for example, need to make measurements in more than one direction (for example, laser Doppler velocimeters use multiple single fiber telescopes to measure wind in different directions in order to more completely measure the wind conditions) or communicate using more than one channel. Conventionally, this problem has been solved by using multiple single-fiber optical systems, using individual telescopes or individual lenses per beam. For example, U.S. Pat. No. 7,505,121 discloses a multi-beam range finder in which the optics includes a discrete objective lens for each angle in the field of view, and which also uses a diffraction grating. The use of multiple single fiber telescopes requires the complete system to be fairly large, increasing in size with the number of telescopes.

SUMMARY OF THE INVENTION

Aspects and embodiments are directed to an optical system capable of and configured to achieve coupling of multiple fibers over a significant (for example, greater than about 5°) field of view. Embodiments of such a system advantageously may provide a significant reduction in system size and potential reduction in system cost relative to conventional systems.

According to one embodiment, there is provided an optical system that can efficiently fiber-couple multiple beams anywhere within a 19.6° or similar full field of view. The system is also passively athermalized, maintaining performance and analysis range over a large temperature range (for example, about 140° C.). Embodiments of the optical system are designed with low back-reflection, and a large entrance pupil diameter given the ability to gather scattered light at large >30 meter (m) ranges, as discussed in more detail below.

According to one embodiment, a multi-beam LIDAR optical system comprises a plurality of single mode optical fibers configured to transmit and receive light beams, and a plurality of lenses configured to collimate and focus the light beams between the plurality of single mode optical fibers and an entrance pupil of the system, wherein the system is configured to transmit and receive the light beams over an angular field of view of at least 5°.

In one example, the plurality of single mode optical fibers consists of three single mode optical fibers. In another example, the plurality of lenses includes a plurality of first lenses, each first lens coupled to one of the plurality of single mode optical fibers, each first lens having negative optical power. In one example, each first lens is positioned a first distance from the respective single mode optical fiber, the first distance selected such that an optical path length difference between an optical path length of a marginal ray from the single mode optical fiber to the first lens and an optical path length of an axial ray from the single mode optical fiber to the first lens is greater than 35 micrometers. In one example, a ratio of a focal length of the system to a diameter of the entrance pupil is in a range of 3.5-5 for standard telecom fiber such as SMF-28. More particularly, in one example, the ratio of the focal length of the system to the diameter of the entrance pupil is 4.2 for standard telecom fiber such as SMF-28. However, more generally, this can be applied to other fibers with different Numerical Apertures (NA) as follows: $(3.5 \text{ to } 5) \times 0.094/\text{NA}_{fiber}$. In one example each of the plurality of lenses has a spherical surface profile. In another example, the system does not include a physical aperture stop. The system may further comprise an athermalization element configured to athermalize the system over a temperature range of approximately 140° C. In one example, the athermalization element is one of the plurality of lenses and made of $CaF_2$. In another example, the athermalization element is a spacer positioned between two of the plurality of lenses, the spacer having a coefficient of thermal expansion that is less than 15 ppm/K.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by references signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
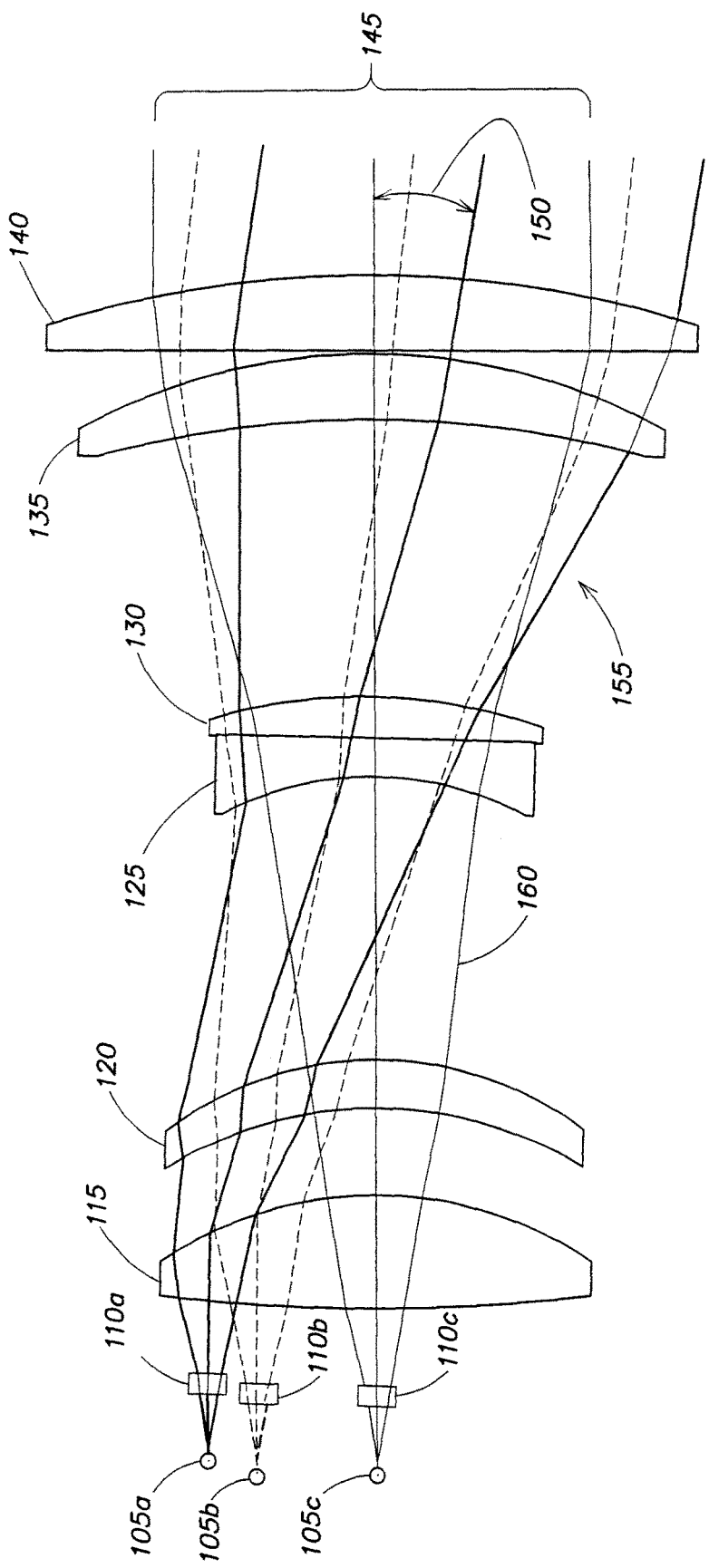
FIG. 1 is a diagram of one example of a wide field of view multi-beam LIDAR optics according to aspects of the invention.

Aspects and embodiments are directed to a multi-beam LIDAR optical system that uses a single mode fiber-based transceiver and which provides a wide field of view (FOV), for example, greater than about 5°. Certain embodiments further provide a highly efficient focal length to entrance pupil diameter ratio, along with passive athermalization, as discussed further below. For example, the focal length to entrance pupil diameter ratio may be in a range of about 3.5 to 5 for standard telecom fiber such as SMF-28. More generally, this can be applied to other fibers with different Numerical Apertures (NA) as follows: (3.5 to 5)×0.094/$NA_{fiber}$. Embodiments of the system may provide numerous advantages over conventional systems, including reduction in size, and the ability to make measurements (e.g., to measure wind speed) in multiple directions simultaneously with a single set of optics.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment. Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

According to one embodiment, an optical system includes a multi-beam single mode fiber coupled collimator configured to efficiently fiber-couple multiple beams anywhere within its field of view. The system has a significant angular field of view (for example, >5°, and in some examples, >19°, full field of view) and large entrance pupil diameter (for example, greater than about 30 mm). As discussed further below, embodiments of the system are passively athermalized via the selection of the mounting and optical materials in conjunction with the optical design parameters. In certain examples, the system is optimized for Gaussian beam transmit apodization and top-hat receive apodization. This may be achieved by setting the focal length to exit pupil diameter ratio to be within a range of about 3.5 to 5. As discussed above, the system may have a large entrance pupil diameter (e.g., >30 mm) allowing it to work to ranges beyond 100 m. Furthermore, embodiments of the system are designed without a physical stop which would limit system power. Additionally, the system may be telecentric in the fiber space, which may simplify mechanics and alignment. In one example, the system is designed with all spherical optical elements, which may be advantageous in terms of cost.

Referring to FIG. 1, there is illustrated one example of a wide field of view multi-beam LIDAR optical system according to one embodiment. The optics are based on the use of single mode fiber (SMF) as both the source and the receiver of light for a given angle. The example illustrated in FIG. 1 includes three fibers 105a, 105b, and 105c; however, those skilled in the art will appreciate, given the benefit of this disclosure, that the system may be configured for more or fewer fibers. Configuring the system for three fibers may be particular useful for applications where measurements in three directions are desired. For example, three dimensional wind direction and speed may be obtained from three to separate angular measurements of wind velocity. The optics includes a plurality of lenses 110a-c, 115, 120, 125, 130, 135, and 140 that form an optical path for the beams of light 160 transmitted and received by the plurality of fibers 105a-c. These elements are discussed further below. As discussed above, the system is configured with a wide field of view, particularly, greater than about 5°. The example system illustrated in FIG. 1 has a full field of view of 19.6°, with a ½ FOV 150 of 9.8°. The large angular field of view allows the system to accommodate the beams from the multiple fibers 105a-c, as shown.

As discussed above, there are numerous communications and remote sensing applications in which the multi-beam LIDAR optical system may be advantageously used. One example is wind measurement. In this application, the large angular field of view allows the instrument to be used to measure the wind velocity along the angles corresponding to the positions 105a-c of the different fibers. From three separate angular measurements, the three-dimensional wind direction and speed can be determined remotely. Additional measurements in different angles allow the option to measure wind shear and turbulence, and/or the wind properties at different ranges. A small angular field of view telescope would not be able to perform this task as ably, at least in part because wind speeds in directions orthogonal to the optics are calculated from the difference in wind speed results from each fiber, which is a small value for a small FOV optics. Noise in the measurements taken using a small FOV telescope may dominate the difference, producing data of little significance.

Certain aspect and embodiments of the multi-beam LIDAR optical system of FIG. 1 may be optimized for wind speed detection, as discussed further below. However, the system may be used for any number of applications, not limited to wind speed detection.

According to one embodiment, optimizing the optics to obtain good system performance with a single mode fiber as both the receiver and transmitter requires a trade-off between two conditions. To emit as much of the light exiting the fiber 105 as possible, the system advantageously has a relatively large entrance pupil diameter (EPD) 145 to let through the entire beam of light. However, the light reentering the device (during receive) may generally have a flat-top apodization (power distribution) due to the relatively uniform Rayleigh scattering that occurs over the small angle that the optics subtend from the perspective of a distant scatter object. Coupling of this flat-top apodized light into the fiber 105 effectively peaks at a specific system focal length to entrance pupil diameter ratio. For single mode fiber (for example, SMF-28) and wavelengths in the S, C & L band regime (approximately 1400 to 1650 nm), this optimal ratio is about 4.2. Combined with the power output efficiency, it is found that the ratio of focal length to entrance pupil diameter is preferably chosen to in the range of about 3.5 to 5. As discussed above, more generally, this can be applied to other fibers with different Numerical Apertures (NA) as follows: (3.5 to 5)×0.094/$NA_{fiber}$.

Figure 2:
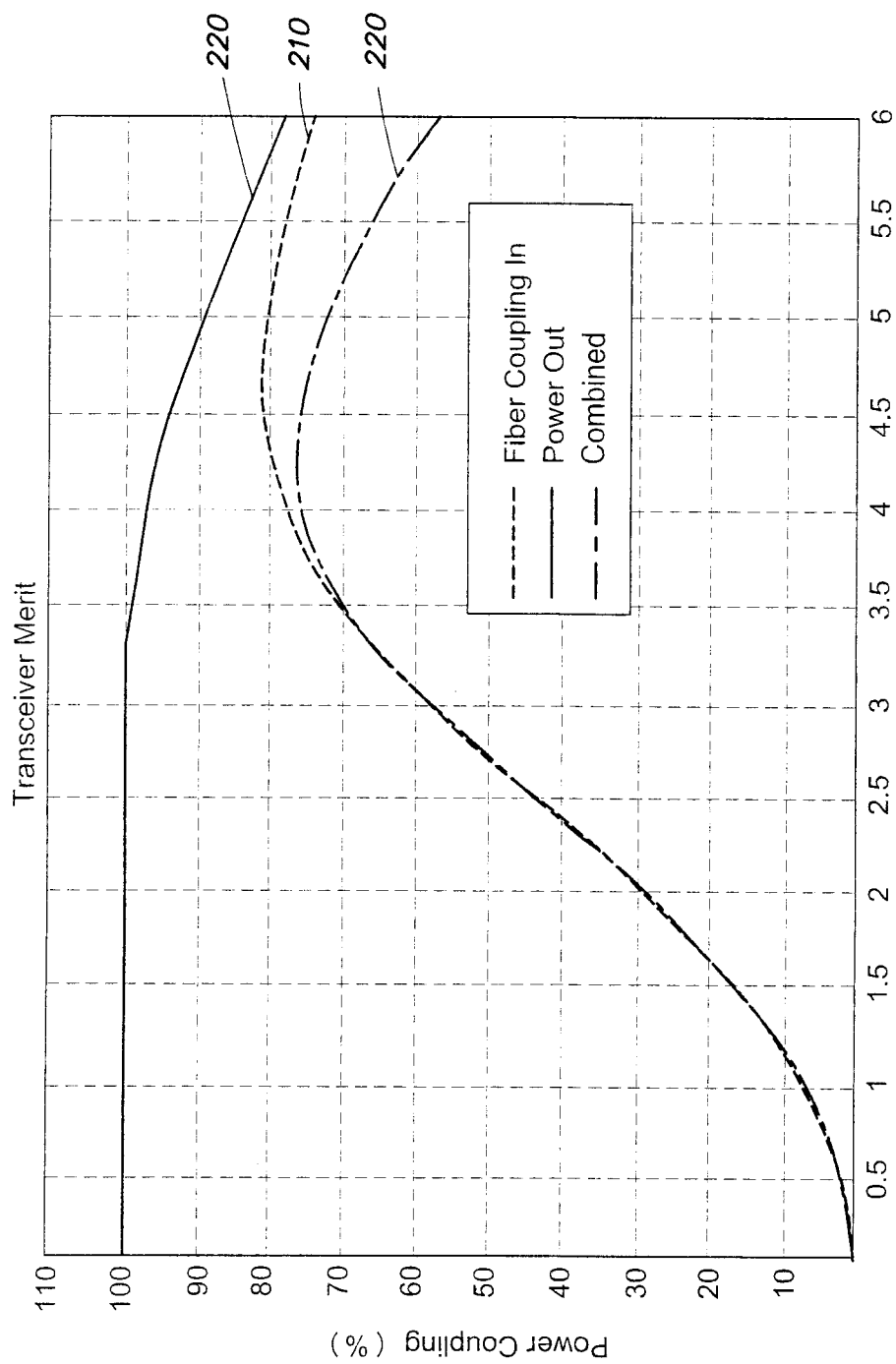
FIG. 2 is a graph illustrating how combining the power efficiency of the Gaussian apodized light exiting the optics times the flat-top apodized light entering the telescope results in the "combined" efficiency curve.

Referring to FIG. 2, there is illustrated a graph of power coupling (%) as a function of the ratio of focal length to entrance pupil diameter (f/EPD). Trace 210 represents the fiber input coupling and trace 220 represents the power output coupling. Trace 230 illustrates how combining the power efficiency of the Gaussian apodized light exiting the optics (output power, trace 220) multiplied by the flat-top apodized light entering the telescope (fiber input coupling, trace 210) results in a "combined" efficiency curve, which peaks at a focal length to EPD ratio of about 4.2.

According to certain embodiments, a large entrance pupil diameter, for example, >30 mm or even >75 mm, may be preferable for long range measurements, such as long range wind speed measurements. The effect of light scattering off aerosols in the atmosphere causes the received power to drop off with the square of the measurement range. This is offset (to within certain limits caused by turbulence) by the received power increasing with the square of the entrance pupil diameter. Accordingly, a large entrance pupil diameter may be advantageous. As discussed above, coupling efficiency considerations may set a desired ratio of the focal length to the entrance pupil diameter. Therefore, selecting a range of viable entrance pupil diameters, and given a known desired ratio of focal length to entrance pupil diameter, may determine a range of focal lengths for the system, and the lenses 110a-c, 115, 120, 125, 130, 135, and 140 may thus be suitably selected and positioned.

According to one embodiment, the optical system is configured with low back-reflection into the fibers 105a-c. A LIDAR instrument that uses the same optics for transmitting the light pulse and receiving the reflected pulse may have some particular design considerations. Specifically, the receiver is generally designed to receive very faint light pulses, much smaller in intensity than the pulse of light that is transmitted. If the transmitted pulse reflects within the optics, and a portion of that light re-enters the fiber, the receiver could be damaged or desensitized. Accordingly, it may be important for LIDAR optics with combined transmit & receive functions to minimize the amount of energy coupled back into the fiber during transmit operations. This specification is referred to as back reflection coupling when a fiber is used with the optics. Back-reflection into the fibers 105a-c may be minimized by selectively configuring and positioning the first optical surface (that closest to the fibers 105). In one example, the radius of curvature of the first surface of the lens 115, and its distance from the fibers 105a-c is designed to limit back reflection to less than 60 dB. This may be accomplished by setting the path length of the axial & marginal rays from the fibers to the first surface of the first lens 110a-c to have a difference of greater than a specified amount. In one example, the path length difference is >35 µm.

Figure 3:
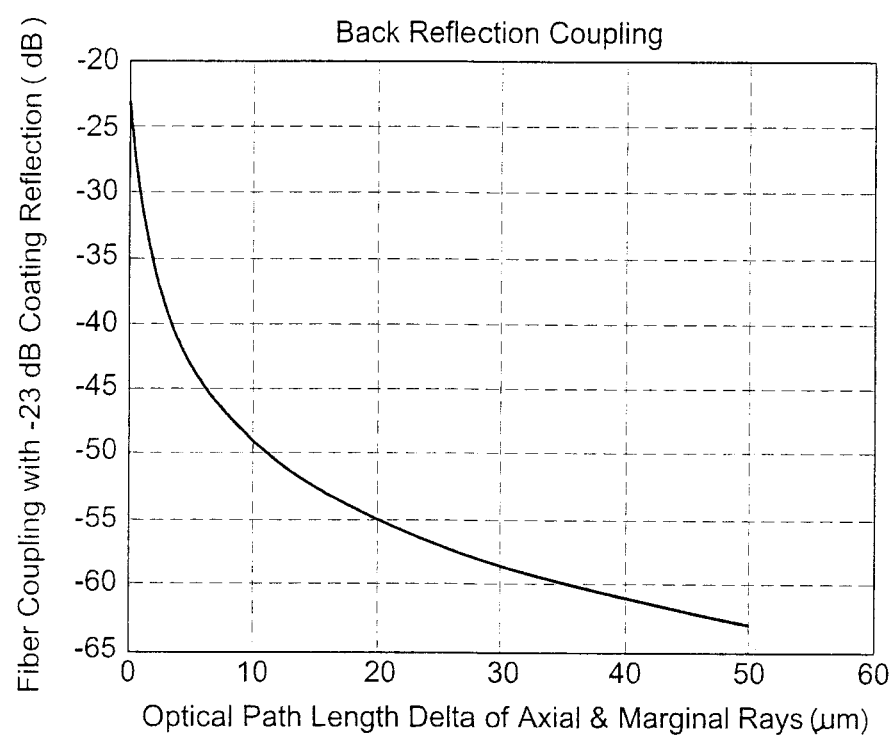
FIG. 3 is a graph illustrating low back reflection achieved in the optics of the disclosure.

FIG. 3 illustrates back reflection coupling and demonstrate a technique which may be used to achieve low back reflection in the optics in the case of light reflecting off the surface of the first lens 110a-c (usually the most significant contributor within the optics). Specifically, FIG. 3 illustrates a graph of the fiber coupling power (in dB), assuming the lens surface is coated with an anti-reflective coating, as a function of the optical path length difference between the paths of the axial and marginal rays of light. By selecting an appropriate path length difference, the amount of back reflection can be limited, as shown in FIG. 3. In one example, the path length of the marginal ray is set by the selected ratio of the focal length to the entrance pupil diameter (F/EPD, for example, 4.2), as discussed above. In order to achieve an overall back reflection specification of −60 dB, for example, with an anti-reflective coated surface reflecting back about −23 dB of the incident light, FIG. 3 demonstrates that the path length difference between the axial and marginal rays should be more than about 35.4 µm, or 40 µm, for example, to allow some margin. This technique for reducing back reflection may be less effective on other lens surfaces in the system because it assumes a spherical phase front error which is technically accurate only on the first surface beyond the fibers 105a-c. However, as noted above, the first lens surface is typically the largest contributor to back reflection, and the back reflection caused by other lens surfaces in the optical train may be insignificant.

According to one embodiment, the first lens 110a-c in the path of each fiber 105a-c, respectively, is a negative lens (having negative optical power). This creates a telephoto system, allowing the physical length of the optics to be shorter than the focal length. In the example illustrated in FIG. 1, the physical length is 69% of the focal length. In certain applications, the optical system may be placed on top of wind turbines, or within aircraft, and therefore reduced size and weight of the system may be important. As noted above, a benefit of the multi-beam optics according to some embodiments of this invention, compared to conventional systems using multiple single-beam optics, is reduced size and weight. The telephoto nature of the optic, primarily determined by the first lens 110a-c allows a smaller optical system. For example, the physical length may be <75% of the focal length.

According to one embodiment, the optical system is telecentric in fiber space. Telecentricity in the fiber space, where the fibers 105a-c are all parallel to the optical axis of the lenses in the system, simplifies the assembly and alignment of the optics. Additionally, in certain embodiments, the optics include no aspheric or diffractive surfaces, nor gradient index lenses. In other words, each of the lenses 110a-c, 115, 120, 125, 130, 135, and 140 may have spherical surface profiles. These choices may reduce the cost of the overall system, although the number of lenses may be increased relative to systems designed with aspheric surfaces. In the example illustrated in FIG. 1, in which each of the lenses 110a-c, 115, 120, 125, 130, 135, and 140 has a spherical surface profile, and is on-axis, the optics include the six common lenses (shared by the beams from all fibers 105a-c) in combination with a small negative lens 110a-c for each fiber 105a-c. In the illustrated example, the six lenses 115, 120, 125, 130, 135, and 140 are arranged into three pairs, as shown; however, numerous other configurations may be implemented, and the optics are not limited to the exact configuration shown. The lenses 115, 120, 125, 130, 135, and 140 collimate and focus the beams 160 transmitted and received by the fibers 105a-c.

As discussed above, according to certain embodiments, the optical system is passively athermalized, thereby maintaining performance and analysis range over a large temperature range (for example, 140° C.). In one example, the system is athermalized with an aluminum housing that houses the lenses 110a-c, 115, 120, 125, 130, 135, and 140. Athermalization of the optics, where the measured range (and performance in general) of the optics remains unchanged over ambient temperature, can be difficult with an aluminum housing. Aluminum has a high coefficient of thermal expansion (CTE) of approximately 23.6 ppm/K, meaning that it expands fairly rapidly over temperature. For optical systems using glass transmitting in the visible range, this expansion of the housing, which increases lens separations, tends to dominate the thermal effect of the lens system. According to one embodiment, this effect of the housing may be countered by using either an athermalization element. In one example, the athermalization element is a positive calcium-fluoride ($CaF_2$) lens element. In one example, the lens 130 is the $CaF_2$ lens element. In another example, the system includes a spacer element have a low (e.g., <15 ppm/K) CTE positioned between the lenses. This spacer (not shown) may be positioned, for example, at the location in the optical train identified by reference numeral 155.

According to one embodiment, the optical system is configured without a physical aperture stop, which if present may limit power transmission. A physical stop is standard practice for many optical systems. However, in the system of FIG. 1, the optical fibers 105a-c define both the angular and spatial acceptance of light, which effectively makes the fibers the stop in the system. Placing an additional stop in the system is either redundant, or may reduce the overall system efficiency.

Thus, aspects and embodiments provide a multi-beam optical system which has a large field of view, is fiber-space telecentric, and athermalized over a large temperature range, and which may be optimized for a single mode fiber transceiver. As discussed above, in certain applications, including the field of wind measurement LIDAR, there are certain particularly desired characteristics of the optics, including large entrance pupil diameters, low back-reflection, and for fiber based transceiver systems, focal length to exit pupil diameter ratios in the region of about 4.2. Embodiments of the multi-beam optical system described above meet these design specifications, and may advantageously provide a system that is considerably lighter, smaller, and/or less expensive than conventional systems configured for similar applications.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

The invention claimed is:

1. A multi-beam LIDAR optical system comprising:
a plurality of single mode optical fibers configured to transmit and receive light beams; and
a plurality of lenses configured to collimate and focus the light beams between the plurality of single mode optical fibers and an entrance pupil of the system;
wherein the system is configured to transmit and receive the light beams over an angular field of view of at least 5°, and wherein a ratio of a focal length of the system to a diameter of the entrance pupil is in a range of 3.5-5.

2. The multi-beam LIDAR optical system of claim 1, wherein the plurality of single mode optical fibers consists of three single mode optical fibers.

3. The multi-beam LIDAR optical system of claim 1, wherein the plurality of lenses includes a plurality of first lenses, each first lens coupled to one of the plurality of single mode optical fibers, each first lens having negative optical power.

4. The multi-beam LIDAR optical system of claim 3, wherein each first lens is positioned a first distance from the respective single mode optical fiber, the first distance selected such that an optical path length difference between an optical path length of a marginal ray from the single mode optical fiber to the first lens and an optical path length of an axial ray from the single mode optical fiber to the first lens is greater than 35 micrometers.

5. The multi-beam LIDAR optical system of claim 1, wherein the ratio of the focal length of the system to the diameter of the entrance pupil is 4.2.

6. A multi-beam LIDAR optical system comprising:
a plurality of single mode optical fibers configured to transmit and receive light beams; and
a plurality of lenses configured to collimate and focus the light beams between the plurality of single mode optical fibers and an entrance pupil of the system,
wherein the system is configured to transmit and receive the light beams over an angular field of view of at least 5°, and wherein a ratio of a focal length of the system to a diameter of the entrance pupil is in a range given by: $(3.5 \text{ to } 5) \times 0.094/NA_{fiber}$, wherein $NA_{fiber}$ is a numerical aperture of the single mode optical fibers.

7. The multi-beam LIDAR optical system of claim 1, wherein each of the plurality of lenses has a spherical surface profile.

8. The multi-beam LIDAR optical system of claim 1, wherein the system does not include a physical aperture stop.

9. A multi-beam LIDAR optical system comprising:
a plurality of single mode optical fibers configured to transmit and receive light beams;
a plurality of lenses configured to collimate and focus the light beams between the plurality of single mode optical fibers and an entrance pupil of the system; and
an athermalization element configured to athermalize the system over a temperature range of approximately 140° C.,
wherein the system is configured to transmit and receive the light beams over an angular field of view of at least 5°.

10. The multi-beam LIDAR optical system of claim 9, wherein the athermalization element is one of the plurality of lenses and made of $CaF_2$.

11. The multi-beam LIDAR optical system of claim 9, wherein the athermalization element is a spacer positioned between two of the plurality of lenses, the spacer having a coefficient of thermal expansion that is less than 15 ppm/K.

12. The multi-beam LIDAR optical of claim 1, further comprising an athermalization element configured to athermalize the system over a temperature range of approximately 140° C.

13. The multi-beam LIDAR optical system of claim 12, wherein the athermalization element is one of the plurality of lenses and made of $CaF_2$.

14. The multi-beam LIDAR optical system of claim 12, wherein the athermalization element is a spacer positioned between two of the plurality of lenses, the spacer having a coefficient of thermal expansion that is less than 15 ppm/K.

15. The multi-beam LIDAR optical system of claim 6, wherein the plurality of single mode optical fibers consists of three single mode optical fibers.

16. The multi-beam LIDAR optical system of claim 6, wherein the plurality of lenses includes a plurality of first lenses, each first lens coupled to one of the plurality of single mode optical fibers, each first lens having negative optical power.

17. The multi-beam LIDAR optical of claim 6, further comprising an athermalization element configured to athermalize the system over a temperature range of approximately 140° C.

18. The multi-beam LIDAR optical system of claim 17, wherein the athermalization element is one of the plurality of lenses and made of $CaF_2$.

19. The multi-beam LIDAR optical system of claim 17, wherein the athermalization element is a spacer positioned between two of the plurality of lenses, the spacer having a coefficient of thermal expansion that is less than 15 ppm/K.

20. The multi-beam LIDAR optical system of claim 9, wherein the plurality of single mode optical fibers consists of three single mode optical fibers.

\* \* \* \* \*